2,894,319
SINTERED POWDERED ALUMINUM BASE BEARING

Robert F. Thomson, Grosse Pointe Woods, Mich., assignor to General Motors Corporation, Detroit, Mich., a corporation of Delaware No Drawing. Application December 29, 1954
Serial No. 478,485

9 Claims. (Cl. 29—182.5)

This invention relates to sintered powdered aluminum base bearings having a high degree of wear resistance with or without subsequent cold or hot working or thermal treatment. More particularly, the invention pertains to sintered powdered aluminum base bearings containing dispersed particles of aluminum oxide.

Porous metal bearings commonly have been employed in industry during recent years, but their use in many applications has been limited because of their relatively low wear resistance. Accordingly, a principal object of this invention is to provide a sintered powdered aluminum base bearing having a high degree of wear resistance due to the presence of aluminum oxide particles dispersed throughout the bearing. A further object of the present invention is to provide a simple, inexpensive process for forming a sintered powdered aluminum base bearing of such a composition having close dimensional tolerances.

These and other objects are attained in accordance with my invention by the addition of aluminum oxide particles to aluminum base metal powder. The formed bearing part, when sintered, or when sintered and worked to a controlled degree of porosity, possesses excellent wear resistance properties due to the presence of the dispersed particles of aluminum oxide. Small proportions of silicon and cadmium also are preferably included in the powdered aluminum base alloy and serve to provide the bearing with greater strength and score resistance.

The resultant wear-resistant sintered powdered aluminum base metal may be advantageously used to form piston pin bushings, camshaft bushings, balancer shaft bushings, thrust washers and other bearing parts. Hence the word "bearing," as used herein, is intended to include all such applications in which relatively moving parts are in engagement and in which high wear resistance and good anti-score properties of the metal parts are desirable.

Sintered powdered aluminum base bearings formed in accordance with the present invention possess not only the aforementioned high wear resistance but also desirable oil-retaining properties. Moreover, these bearings, when compared with similar parts made by normal manufacturing methods, do not require the expensive machining operations otherwise frequently necessary to provide proper tolerances. In turn, since little or no machining is necessary, scrap or waste is reduced to a minimum.

On sintering, the high melting aluminum oxide particles do not appreciably alloy with the powdered aluminum base mix to which they have been added, but tend to remain in substantially the same form in which they are introduced. Consequently, the resultant bearing possesses higher wear resistance than it would if the aluminum oxide particles alloyed with the base metal to an excessive extent.

Other objects and advantages of the present invention will more fully appear from the following detailed description of preferred embodiments of this invention.

The bearing is formed by initially thoroughly mixing finely pulverized aluminum oxide with an aluminum base powder. Other elements, such as magnesium, cadmium, silicon, chromium, nickel, copper, lead, bismuth, tin, indium and a small amount of iron, may be included in the bearing material. Various incidental impurities also may be present in the usual small amounts without any substantial detrimental effects. Most of the aforementioned elements normally may be wholly or partially alloyed with the aluminum. Hence the various aluminum base bearing alloys disclosed in co-pending patent applications Serial Nos. 250,191, 250,192, 276,877, 328,265, 328,266, 346,780, 349,301 and 349,302, all in the name of Alfred W. Schluchter, and now Patent Nos. 2,766,116, 2,763,546, 2,807,540, 2,752,239, 2,752,240, 2,754,202, 2,770,031 and 2,831,764, may be prepared in powdered form, sintered, briquetted and have their wear resistance increased by the addition of aluminum oxide particles in accordance with the present invention. In general, the preferred maximum amounts of these constituents are approximately as follows: magnesium 3%, cadmium 5%, silicon 11%, chromium 2.25%, iron 0.5%, nickel 4%, copper 5%, lead 3%, bismuth 5%, tin 0.3% and indium 0.5%.

I have obtained best results when the aluminum constitutes between about 75% and 97% of the total mix. The increased wear resistance provided by crystalline aluminum oxide particles is so pronounced that a sintered powdered metal mix of even pure or commercially pure aluminum containing such particles may be used as a bearing for some applications. However, it will be understood that the terms "aluminum base metal," "aluminum base bearing" and "aluminum base alloy," as used herein, are intended to encompass alloys and powdered metal mixtures in which aluminum is the major constituent in the powdered metal mixture and preferably constitutes at least 50% of such a powdered metal mixture or alloy.

Aluminum or aluminum alloy powder of approximately —150 mesh has provided excellent results, although the particle size of this powder may vary from —60 to —325 mesh and still produce a satisfactory bearing. Other metal powders in the base material preferably also should have particle sizes within this range.

The frictional properties, particularly score resistance, of the powdered aluminum base alloy may be improved by the presence of relatively small amounts of silicon, cadmium, lead or bismuth. Likewise, minor amounts of magnesium, nickel, copper and chromium may be alloyed with the aluminum to increase the hardness or hardenability of the resultant alloy. Chromium also normally confers higher strength and greater machinability to aluminum alloys and, if the alloy contains magnesium, chromium will enhance score resistance by compensating for the detrimental effects of magnesium on this property. Both chromium and silicon also tend to increase the strength of aluminum base bearing alloys. A small amount of tin is frequently useful for increasing the corrosion resistance of any lead present in the alloy used. Indium likewise may be included in small amounts in certain aluminum base alloys to improve their corrosion resistance, particularly if the alloys contain cadmium.

More specifically, excellent wear resistance and other desirable physical properties are obtained with the type of aluminum bearing alloy disclosed in Patent No. 2,238,399 Schluchter to which crystalline aluminum oxide particles have been added. Accordingly, at present I prefer to use an aluminum base powdered metal mix consisting essentially of about 2% to 10% silicon, 0.5% to 5% cadmium and the balance substantially all aluminum. These elements may be initially alloyed and subsequently pulverized to form an aluminum base alloy powder or they may be added to the mix as individual powdered constituents. A silicon content of approximately 4% and a cadmium content of approximately 1.1% appear to provide excellent results for commercial use.

Even a relatively minute amount of the aluminum oxide powder improves the wear resistance of the bearing to a measurable extent, and the range of this constituent may vary from a small but effective amount to a quantity constituting approximately 20% by weight of the final mix. However, in order to provide the desired economy and strength, particularly impact strength and shock resistance, the aluminum oxide content preferably should be maintained between 0.25% and 10% by weight. When more than 10% aluminum oxide is used, the tensile strength and ductility of the sintered powdered aluminum base bearing are somewhat reduced. This reduction in physical properties becomes quite pronounced when the aluminum oxide content is raised above 20%. The excessive brittleness of such a bearing, which precludes its effective use in most applications, is evidenced by chipping or cracking of wear test specimens when they are being ground. Optimum properties are usually obtained when the bearing contains approximately 1% to 5% of the aluminum oxide powder.

In view of the above considerations, I have found that a sintered powdered aluminum base bearing having excellent wear resistance is one which comprises approximately 1% to 5% by weight of crystalline aluminum oxide powder, 2% to 10% silicon, 0.5% to 5% cadmium, and the balance substantially all aluminum.

Among the aluminum oxides which may be used are fused $Al_2O_3$, such as Alundum, and the impure $Al_2O_3$ containing minor amounts of iron oxide and known as "Turkish emery." Corundum (a form of natural $Al_2O_3$) and tabular corundum (calcined $Al_2O_3$) likewise can be successfully employed in according with the present invention. Specific examples of these forms of crystalline aluminum oxides include the commercially available compounds identified as Alundum 600X, Alundum 320B, corundum 300, tabular corundum —100+200 and Turkish emery 320. The numerals following the alumina classification in each instance indicate the approximate particle size of the alumina particles. The proper use of appropriate amounts of any of these forms of aluminum oxides in the manner hereinafter described results in the production of a sintered powdered metal part having substantially improved wear resistance. Approximately —100 to —600 mesh aluminum oxide powder may be used, but —250 to —350 mesh particles are preferred. Crystalline aluminum oxide particles which are too course are somewhat prone to cause scoring.

The sintered powdered aluminum base bearing may be formed by first briquetting a mixture of the pulverized aluminum oxide and the base metal powder at an appropriate pressure in a die having a contour which is complementary to the bearing surface to be formed. Although a briquetting pressure between approximately 30,000 and 120,000 pounds per square inch has proved to be satisfactory, 60,000 to 100,000 pounds per square inch appears to be the optimum pressure range for most applications. Before briquetting, it is important that the powdered metal constituents be thoroughly mixed in order to provide uniformity of structure and properties to the resultant bearing.

The green briquette is then sintered under suitable conditions of time, temperature and atmosphere into a structure having a controlled degree of porosity. Sintering temperatures between 1000° F. and 1200° F. and sintering times between twenty and sixty minutes appear to be highly satisfactory, particularly for the aforementioned aluminum base briquettes containing silicon and cadmium. The above sintering times are not critical, however, and sintering times as short as five minutes and as long as two hours produce satisfactory wear test results. Excellent results have been obtained by sintering the briquette at approximately 1150° F. for approximately thirty minutes in a non-oxidizing furnace atmosphere, such as "Neutralene," dissociated ammonia, dry "Drycolene" gas or a gaseous mixture of "Neutralene" and a small amount of natural gas.

The Neutralene atmosphere is a gaseous mixture which usually consists of approximately 1.5% carbon monoxide, 1.5% hydrogen and 97% nitrogen. It has proved advantageous to use a mixture of 100 parts of Neutralene and one part of natural gas. Dry Drycolene gas is a closely related gaseous mixture and is normally composed of approximately 77% nitrogen, 20% carbon monoxide and 3% hydrogen. Of course, other furnace atmospheres which preferably contain high nitrogen contents, such as mixtures of nitrogen and hydrogen or methane, can be used. Neutralene is preferred at present because it is readily available and provides a highly effective protective atmosphere.

Frequently both the strength and fatigue resistance of the formed sintered powdered aluminum base bearing may be improved by suitable heat treatment. For example, I have found that a solution treatment at a temperature between approximately 900° F. and 1050° F. for a period of about 8 to 15 hours is effective. Upon removing the sintered bearing from the furnace following the solution treatment, it is preferable to cool it immediately by quenching in water. This treatment appears to increase the ductility of the bearing.

A precipitation treatment may thereafter be employed to substantially increase the hardness of the aluminum base bearing. This process is preferably carried out by heating the bearing for 5 to 10 hours at a temperature of approximately 300° F. to 400° F., a precipitation treatment at 370° F. for eight hours being particularly satisfactory. The bearing then may be again cooled, preferably in water.

It will be understood that a sintered powdered aluminum base bearing containing dispersed particles of aluminum oxide in accordance with this invention may be manufactured under the usual porous metal techniques as disclosed in a number of patents, such as Patents Nos. 1,738,163, 2,097,671, 2,075,444, etc. Also, instead of briquetting the metal powder as hereinbefore explained, it may be molded to shape prior to sintering as suggested in Koehring Patent No. 2,198,702.

Likewise, the powdered metal mix may be merely spread on or otherwise placed in contact with a supporting surface and subsequently sintered. This supporting surface may be a non-porous metal backing strip, such as a steel strip, and the powdered metal may be bonded to the back on sintering. When this latter procedure is used, it may be desirable to first electrodeposit a suitable metal plate on the surface of the back to improve the strength of the bond. This type of process is disclosed in Koehring Patents Nos. 2,187,086 and 2,198,253. After sintering, the composite of spongy aluminum base alloy on the back may be rolled to increase the density of the powdered metal bearing and then resintered or annealed. Additional rolling and annealing treatments can be employed to further increase the density of the bearing. In this manner a highly wear-resistant sintered aluminum alloy bearing layer can be formed on a steel back.

All of the above modifications are understood to be within the scope of the present invention, which broadly comprehends the provision of a sintered powdered aluminum base bearing containing dispersed particles of aluminum oxide.

Wear tests were conducted to compare sintered powdered aluminum base metal samples formed in accordance with my invention with sintered powdered aluminum base samples containing no aluminum oxide particles. These samples were prepared as tensile bars briquetted at a pressure of 100,000 pounds per square inch. They were then sintered for 30 minutes in a Neutralene atmosphere at a temperature of 1150° F. and subsequently cooled in this atmosphere. None of the samples was forged. Each specimen to be tested was machined to prepare a ⅛ inch by 1⅛ inch rubbing surface. The specimens were next successively locked in a fixture of the wear test machine and placed in contact with a rotating smooth-surfaced cast iron wheel having a face width of one inch. Increased wear resistance was measured by decreased weight loss in grams and in decreased volume loss in cubic inches.

A wear test using this apparatus was conducted in which the specimen load was increased to 251 pounds and retained at this figure for a total test period of five hours. Typical of the results were those obtained from testing specimens formed of a sintered powdered alloy consisting essentially of about 4% silicon, 1.1% cadmium and the balance aluminum. At the end of the five hour test period, these specimens had lost an average of 0.2255 gram and their volumes were reduced an average of approximately $5210 \times 10^{-6}$ cubic inches. On the other hand, when crystalline $Al_2O_3$ powder was added to the aforementioned mix in amounts of 2% to 5%, the average weight loss of these specimens was only 0.0018 gram and the volume loss only about $11 \times 10^{-6}$ cubic inches. These results are also appreciably better than the results obtained when the same test was used to evaluate a cast and wrought alloy of the same composition but which did not contain aluminum oxide particles. This wrought alloy underwent a volume loss of approximately $3412 \times 10^{-6}$ cubic inches and showed a correspondingly large weight loss. The results of these tests, which show the relatively low weight and low volume loss of my new sintered powdered aluminum base bearing material under severe wear test conditions, prove its high wear resistance.

Other tests indicated that the addition of the hard particles of $Al_2O_3$ also appears to improve the tensile strength and ductility of the bearing. For example, a test specimen formed of sintered aluminum base powder consisting essentially of 4% silicon, 1.1% cadmium and the balance aluminum was found to have an ultimate tensile strength of 8910 pounds per square inch. This specimen underwent about 1.4% elongation in one inch before rupture. Specimens formed of the same sintered powdered aluminum base alloy powder to which small percentages of crystalline $Al_2O_3$ had been added possessed both greater ultimate tensile strength and ductility. For example, a specimen of this type which contained 2% $Al_2O_3$ had an ultimate tensile strength of 12,000 pounds per square inch and a 2.5% elongation at rupture. A similar sample containing 5% $Al_2O_3$ was found to have an ultimate tensile strength of 11,800 pounds per square inch and an elongation at rupture of about 2.7%.

While the present invention has been described by means of certain specific examples, it is to be understood that the scope of the invention is not to be limited thereby except as defined in the following claims.

I claim:

1. A sintered powdered aluminum base metal article consisting of 0.25% to 10% hard particles of crystalline aluminum oxide and the balance substantially all an aluminum base alloy.

2. A highly wear-resistant sintered powdered bearing formed from a powdered metal mixture comprising approximately 0.25% to 20% of dispersed hard particles of crystalline aluminum oxide and the balance substantially all a pulverized aluminum base alloy containing small amounts of silicon and cadmium.

3. A highly wear-resistant sintered powdered metal bearing comprising approximately 0.25% to 20% hard particles of crystalline $Al_2O_3$, a small but effective amount not in excess of approximately 10% silicon, a small but effective amount not in excess of 5% cadmium, and the balance substantially all aluminum.

4. A wear-resistant sintered powdered metal bearing consisting essentially of approximately 0.25% to 10% hard particles of crystalline aluminum oxide, 2% to 10% silicon, 0.5% to 5% cadmium, and the balance substantially all aluminum.

5. A highly wear-resistant sintered powdered metal bearing formed from a mixture consisting essentially of about 0.25% to 10% crystalline aluminum oxide in the form of dispersed finely divided hard particles, 2% to 10% silicon powder, 0.5% to 5% cadmium powder, and the balance substantially all aluminum powder.

6. A sintered powdered aluminum base bearing characterized by high wear resistance, said bearing consisting essentially of about 1% to 5% crystalline aluminum oxide in the form of finely divided and dispersed hard particles having a mesh size of approximately $-100$ to $-600$, silicon not in excess of 10%, cadmium not in excess of 5%, and the balance substantially all aluminum.

7. A sintered powdered bearing characterized by oil-retaining properties and high wear resistance, said bearing formed from a mixture of 1% to 5% hard crystalline $Al_2O_3$ powder and an aluminum base alloy powder consisting essentially of about 2% to 10% silicon, 0.5% to 5% cadmium, and the balance aluminum.

8. A sintered aluminum base bearing formed from a powdered mix consisting essentially of 0.25% to 10% corundum particles and the balance substantially all aluminum base metal.

9. A sintered aluminum base bearing formed from a powdered mix consisting essentially of 1% to 5% hard particles of crystalline $Al_2O_3$ having a mesh size of approximately $-100$ to $-600$ and the balance substantially all aluminum base metal.

References Cited in the file of this patent

UNITED STATES PATENTS

| 2,072,070 | Fisher | Feb. 23, 1937 |
| 2,238,399 | Schluchter | Apr. 15, 1941 |
| 2,294,405 | Hensel et al. | Sept. 1, 1942 |
| 2,372,202 | Hensel et al. | Mar. 27, 1945 |
| 2,568,157 | Lepp et al. | Sept. 18, 1951 |

OTHER REFERENCES

Goetzel: "Treatise on Powder Metallurgy," publ. 1949, vol. 1 pp. 683, 684; vol. 2 pp. 523, 527 publ. 1950.

Metal Progress, vol. 62, pp. 109–112, Dec. 1952.

Goetzel: "Treatise on Powder Metallurgy," New York Interscience, 1949, vol. I, pages 1–6.